United States Patent [19]
Lech et al.

[11] 3,750,405
[45] Aug. 7, 1973

[54] CLOSED CENTER HYDRAULIC SYSTEM
[75] Inventors: Richard J. Lech, Hickory Hills;
Joseph F. Ziskal, Downers Grove;
Marvin D. Jennings, Naperville;
Harold R. Orth, Hinsdale; Eugene P. Virtue, Tinley Park, all of Ill.
[73] Assignee: International Harvester Company, Chicago, Ill.
[22] Filed: Aug. 16, 1971
[21] Appl. No.: 171,933

[52] U.S. Cl.............. 60/422, 60/427, 60/445, 60/484, 417/213, 60/462
[51] Int. Cl............................. F15b 11/16
[58] Field of Search ............... 60/52 S, 52 VS, 422, 60/427, 445, 484, 52 HE; 417/212, 213, 222

[56] References Cited
UNITED STATES PATENTS
2,799,995   7/1957   Herman.......................... 60/52 S
2,892,311   6/1959   Van Gerpen .................... 60/52 VS
2,892,312   6/1959   Allen et al. ...................... 60/52 VS
3,635,021   1/1972   McMillen et al. ................ 417/213

Primary Examiner—Edgar W. Geoghegan
Attorney—Floyd B. Harman

[57]   ABSTRACT

A closed center hydraulic system having a variable displacement pump, two or more motor circuits associated therewith, one circuit being of the proportional demand type, priority means assuring the power requirements of said proportional demand circuit are met prior to permitting power flow to the other circuit, and flow and pressure compensating means in the other circuit for controlling the displacement of the pump.

20 Claims, 1 Drawing Figure

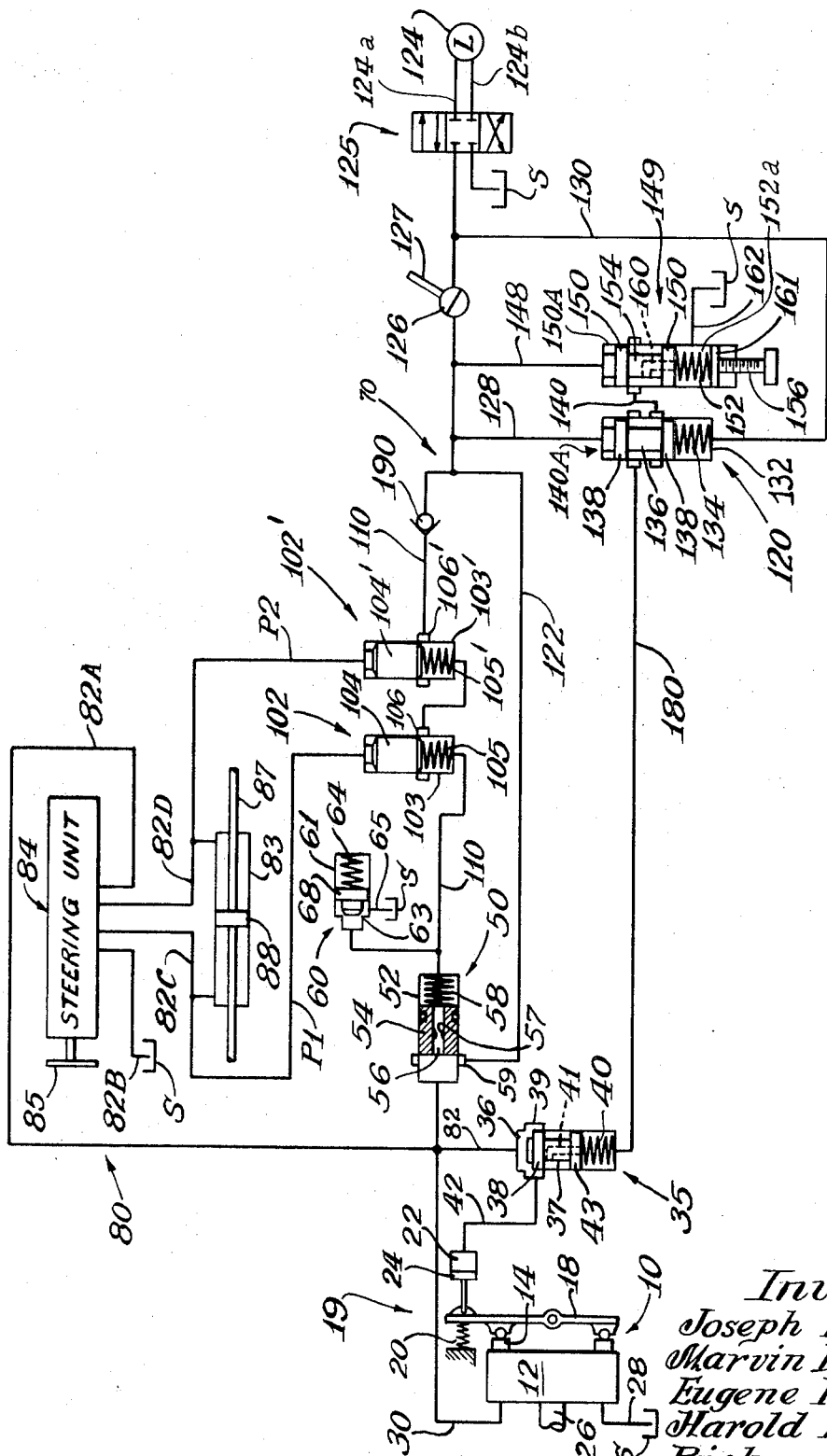

CLOSED CENTER HYDRAULIC SYSTEM

BACKGROUND OF THE INVENTION

This invention relates to a hydraulic system in which a pump delivers fluid to two different circuits, each having varying power requirements. Having utility in many fields, one primary application relates to hydraulic systems for farm tractors in which a single pump is utilized to provide hydraulic power to a steering unit, a brake unit, a hydraulically actuated hitch as well as to auxiliary equipment, the auxiliary equipment comprising some form of hydraulic motor often associated with an implement pulled by the tractor. In such circuits, vehicle control units such as the steering device, the hitch and the power brakes must, for safety purposes, have priority on the power delivered by the pump and their power requirements may vary considerably. For example, the steering or hitch circuits may require both variable flow rates at various pressures, and such demands should have priority over auxiliary equipment. Similarly, the motors associated with auxiliary equipment may be limited in terms of the pressure they will accept or the speed at which they operate. Further it is desirable that the pump be controlled in such a manner as to produce only the power required to perform these functions since any additional power provided is merely converted into heat and represents an energy loss.

SUMMARY OF THE INVENTION

Accordingly, the instant invention comprises a hydraulic system utilizing a variable displacement pump, two or more hydraulic circuits, with appropriate controls therein to insure that the power developed by such pump is equivalent to the power requirements made upon the system, and not in excess thereof. Thus one circuit is provided for the power utilization relating to control of the vehicle which should have priority, which a second circuit is provided to operate the motors, associated with auxiliary equipment, the second circuit additionally having flow and pressure controls of such a nature to insure that the pump generates sufficient power to match the loads required by the first circuit, and the power requirements of the second circuit.

Accordingly, it is an object of this invention to provide a hydraulic system having multiple circuits with different load requirements with control compensators in said circuits to insure that the power generated is substantially equivalent to the power requirements of the loads, and not in excess thereof. More specifically it is an object of the instant invention to provide a variable displacement hydraulic circuit for a farm tractor in which the vehicle controls are in a separate circuit and have a demand type proportional priority control features for insuring that the pump provides such power to these critical functions, and a second circuit for running auxiliary equipment having flow and pressure type compensators for insuring that the pump matches the power requirements of such auxiliary equipment and does not overspeed or direct excessive pressure thereto. Viewed in another light it is an object of this invention to provide a hydraulic system for a tractor in which the pump is providing power at a low "standby" rate sufficient to meet the requirements of both circuits, but which upon demand will produce additional power substantially equal to the requirements of each.

DESCRIPTION OF THE DRAWINGS

The manner in which the objects of the invention is attained will be made clear by consideration of the following specification and claims when taken in conjunction with the accompanying drawing in which the lone FIGURE is a schematic representation of my invention.

DETAIL DESCRIPTION

As depicted in the preferred embodiment, a conventional axial piston or other variable displacement type pump 10 receives power from an engine (not shown) through a shaft 26 in such a manner that pistons 14 are reciprocated by a swash plate 18 as the pump barrel 12 rotates. Appropriate internal valving means (not shown) will be effective to insure that on the intake stroke fluid is drawn from a sump S through a conduit 28, and delivered to a delivery conduit 30. Controlling the displacement of the pump 10 is a spring 20 which biases the swash plate to a maximum displacement position, and a servo or de-stroking mechanism 19 which acts against the spring upon the development of control pressure delivered through a conduit 42 to act against a piston and rod element 24 to rotate the swash plate about a trunion so as to reduce the pump displacement.

Fluid delivered by the pump 10 to the conduit 30 is directed to a first circuit 80 as well as to a second circuit 70 comprising conduit 122, the power being divided between these circuits under control of a priority establishing means in the form of a pressure-controlled valve means 50 as hereinafter explained. Within the first circuit fluid is directed through a conduit 82A and steering unit 84 to a motor or cylinder 83 controlling the steering of the vehicle, the piston rod 87 being associated with the steering wheels (not shown). The steering unit 84 may be of the well known geroter type which is actuated by steering wheel 85 on the operator's station of the vehicle. Accordingly fluid is directed to the steering unit through the conduit 82a and to an appropriate side of the hydraulic motor 83 through one of the conduits 82c or 82d, depending upon the direction of steering, while fluid will be returned from the opposite side of the hydraulic motor 83 into the steering unit 84 and thence to the sump S through conduit 82b. Additionally depicted in the steering circuit are pressure sensing lines P1 and P2 which will be discussed hereinafter.

The above-mentioned priority estabishing valve means 50 which is of the proportional demand type is intended to insure that the steering motor 83 always receives sufficient power. The priority establishing valve means 50 comprises a chamber 52 having a spool 54 therein which is biased forwardly by a spring 58. A bore 56 passing through the spool 54 is provided with an orifice 57 whereby fluid may be metered through the priority valve for purposes hereinafter described. With the spring 58 biasing the spool 54 forwardly to at least partially cover port 59 fluid power delivered by the pump 10 will be first directed to this first circuit 80, and as the spool moves rearwardly excess fluid energy will be directed into the conduit 122 which is part of the second circuit 70. Preferably, the spring 58 is of a low rate, and will ordinarily permit the priority valve to open before the pump generates any substantial amount of pressure. However, to insure that sufficient power is directed to the steering unit 84, demand type valves are added to the first circuit 80. For example, the delivery conduits 82c and 82d which direct fluid into respective ends of the cylinder 83 have associated therewith sensing conduits P1 and P2. As the operator of the vehicle turns the steering wheel 85, the hand pump in steering unit 84 will generate some pressure in either conduit P1 or P2, depending upon the chamber to be expanded and such pressure will selectively act against demand type valves 102, or 102'. Since these valves are identical, only valve 102 will be discussed in detail, and corresponding parts of valve 102' will be designated with the same reference character with the addition of a prime. Valve 102 includes a cylindrical chamber 103, having a piston means 104 therein, which is biased upwardly as viewed in the drawing by a spring 105. A conduit 110 is then interconnected serially with chambers 103,103' between the chamber 52 of the priority valve 50, and the conduit 122 of the second circuit, the conduit 110 having been interconnected to the chambers 103 and 103' in such a manner that the spools 104 and 104' may act as valves to preclude or limit the flow through the conduit 110 upon the generation of a pressure signal in P1 or P2. Thus, if a pressure signal is generated in conduit P1 so as to apply force downwardly upon spool 104, fluid can no longer flow through the conduit 110 as the outlet groove 106 circumscribing chamber 103 is closed by spool 104. With such flow precluded, the forward bias on the priority valve 50 is increased and thus additional power will be directed to the first circuit 80, the amount of power delivered to such circuit being dependent upon the pressure signal generated in the conduits P1 or P2. It should be apparent that with respect to the demand valves 102 and 102', such will be urged downwardly against the spring force of the springs 105 and 105' due to the pressure added to the sensing circuits P1 and P2 by the hand pump conventionally associated with such steering units.

Concerning the design of these demand valves, the areas should be designed such that a sensing force applied to the top of spool 104 or 104' will overcome the spring and hydraulic forces on the bottom, wherefore as the pressure demand by the motor 83 is diminished and the manually developed pressure in conduits P1 and P2 is thus diminished, pressure of fluid delivered through bore 56 and acting on the bottom of the spool 104 or 104' in conjunction with the spring 105 or 105' should move the spool 104 or 104' upwardly. In this manner, the power requirements of the first circuit are met. The orifice 57 prevents excessive fluid pressure developing in the first circuit, because the orifice communicates this pressure to the chambers 103, 103' to move the spools 104,104' upwardly in response to a pressure increase below a harmful value, thereby uncovering grooves 106,106' and reducing the force behind the spool 54 of priority valve 50 such that the excess fluid energy may flow to the second circuit conduit 122.

To insure that the priority valve 50 opens to admit power to the second circuit 70, a relief valve 60 may be incorporated behind the priority valve 50 and acts as a pilot operated relief. This valve comprises a chamber 61 having a reciprocable piston 68 therein biased forwardly against the seat 63 by spring 64. Thus if pressure in the conduit 110 were to build up beyond a given pressure setting (for example 2,200 PSI) spool 68 is moved rearwardly to dump some fluid to the sump to reduce the force behind the priority valve 50 permitting its spool 54 to move rearwardly whereby fluid energy is directed through port 59 to the second circuit 70. Thus, if the steering wheels are turned to their maximum position, and if continued manual effort is applied to wheel 85, the demand valve 104, for example, closes conduit 110, and but for the relief valve 60, the priority valve 50 might not open if opposing pressures on the ends of spool 54 should neutralize one another and permit the force of the spring to dominate and cause the port 59 to be closed.

A regulator or compensator mechanism 35 is also associated with the first circuit 80 so that if pressure above a given upper limit is developed therein, this pressure will be imposed through a conduit 82 on such mechanism to cause de-stroking of the pump 10. Compensator mechanism 35 includes a chamber 36 with a spool 37 therein having an upper piston 38 against which fluid pressure may be downwardly directed. When such pressure exceeds the force of the spring 40 (preferably having a high spring rate so as to open at maximum desired system pressure) urging the spool upwardly, the spool will be forced downwardly whereby piston 38 uncovers annular port 39 so fluid pressure will be directed through conduit 42 into the de-stroking mechanism 19 to urge the piston 24 forwardly to de-stroke (diminish the stroke of) the pump 10. The spool 37 is also provided with a lower piston 43 against which fluid pressure may act so as to move the spool upwardly. A bore 41 extends axially upwardly in the spool 37 from its lower end and then extends radially to the spool circumference between the pistons 38 and 43 so as to provide communication between a control conduit 180 and the space between the pistons. As later explained, excessive flow or excessive pressure in the second circuit 70 will be denoted by pressure transmitting through conduit 180 and acting against piston 43 to supplement the force of spring 40 for moving spool 37 upwardly so that fluid in conduit 180 may impose fluid pressure through bore 41 and through port 39 into conduit 42 for acting against servo mechanism 19 to de-stroke the pump.

Considering now the second circuit 70, fluid may be delivered through the priority valve 50, (after the power requirements of the first circuit are supplied) to the conduit 122 which is communicatable with a directional flow control valve 125 and a hydraulic coupler (not shown) which couples exterior hydraulic lines 124a, 124b with a hydraulic motor L on an associated implement. To regulate the power delivered to load L, the second circuit comprises a flow control compensator means 120 and a pressure compensating means 149 as well as a control conduit 180 leading back to the first compensator 35 adjacent the de-stroking mechanism 19. The flow control compensator 120 comprises, preferably, a variable orifice 126 in conduit 122 having a lever 127 for controlling the orifice size. To insure that a specific flow rate is obtained for each orifice setting, a valve 140A is provided for controlling the pump displacement so as to maintain a specific pressure drop across the orifice. This valve 140A comprises a chamber 132 reciprocatively containing a spool 136 having lands 138 thereon. Pressure upstream and downstream of the orifice 126 is directed against the lands 138 through conduits 128 and 130, and if the differential pressure downwardly on spool 136 exceeds the upward force of spring 134, the spool will be moved axially downward and admit fluid from conduit 128 to control conduit 180. For example, if the force due to pressure ahead of orifice 126 exceeds the spring force and the force due to pressure downstream from the orifice, the spool 136 moves downward and fluid is directed from conduit 128 through conduit 180 to compensator 35. Such pressure acting against the bottom of piston 43 in conjunction with the force of spring 40 will urge this spool upwardly so hydraulic fluid can pass through the interior bore 41 of the spool 37 to be transmitted to conduit 42. Consequently fluid pressure will act upon the piston 24 to de-stroke (diminish the stroke of) the pump 10 such that less flow will be produced in conduit 122. To provide a control means for the pressure directed to the motor L through the conduit 122, the pressure compensator 149 is added to the second circuit 70. A conduit 148 is communicative with the interior of valve housing 150A above the upper land 150 of spool 154 so as to permit fluid pressure to be directed against such upper land 150. If the force of spring 152 is overcome by such pressure, fluid is directed through conduit 140, through the chamber 132 about spool 136 (such being upward as it is assumed the flow requirements are not being exceeded) and through conduit 180 to the regulator 35 and from here to act against the piston 24 to regulate the stroke of the pump. By providing the spring 152 in the chamber 152a with a manually controlled seat 161, any desired pressure on the motor 124 may be obtained, so long as the flow rate permitted by compensator 120 through orifice 126 is not exceeded. Thus a threaded stemmed knob 156 installed in the lower end of chamber 152a provides a control means for setting an upper limit for pressure in the second circuit conduit 122. The spring 152 should have a high spring rate.

At this point it would be appropriate to note that the input pressure to each of these three compensators 35, 120 and 149 is connected in parallel with either the first or the second circuits, while a control conduit 180 which leads from the de-stroking mechanism 19 to a sump S is connected in series with such compensators. The pressure compensator 149 of the second circuit 70 is thus provided with a passage through the reduced diameter of the spool such that fluid may be exhausted from the de-stroking mechanism 19 serially through each of the compensators. For example, if none of the compensators are operating at their intended or set pressures, the first compensator 35 will have its spool 37 biased upwardly by spring 40 and thus fluid within chamber 22 of the de-stroking mehanism is free to communicate through the conduit 42, the bore 41 and into conduit 180. Since the flow control compensator 120 is also biased upwardly and since the flow has not reached the flow rate set by the orifice 126, the spool 136 will also be in an upward position and fluid may pass into the chamber 132 between the two lands 138, to be conducted through conduit 140 into the pressure compensator 149 which is in its upward position since its maximum pressure setting has not been reached. Such fluid may then enter the bore 160 of the spool 154 and exit through the conduit 162 to the sump S. Accordingly, while none of the control pressures set upon the system are obtained, the spring 20 will pivot the pump swash plate 18 in a clockwise direction, exhausting fluid from chamber 22, whereby the stroke will be increased as will the displacement of the pump 10.

MODE OF OPERATION

To more fully disclose and depict the operating advantages of the instant invention, four different operating conditions will be considered. First, assume that spring 40 of the first compensator 35 has a high spring rate, and will permit the spool 37 to shift downwardly to admit fluid to the servo or de-stroking mechanism 19 when pressure exceeds 2,500 PSI. Too, assume that the pressure compensator 149 is also set at a maximum pressure setting of 3,000 PSI by the position of seat 161, and that the valve 125 is in neutral. This situation is depicted in the drawing. Under such conditions, the pump will deliver power to the conduit 30 and as 2,500 PSI is developed, spool 37 is urged downwardly against spring 40 such that fluid may enter chamber 22 to de-stroke the swash plate 18 to a minimum displacement and the pump stand-by pressure will be 2,500. Inasmuch as relief valve 60 should be designed to open at 2,200 PSI, it is now open, and a small amount of fluid passing through orifice 56 is dumped to the sump. Such flow permits priority valve 50 to open, but there will generally be no flow to the first circuit as check valve 190 prevents flow from the second circuit to the first circuit.

Next, assume that none of the vehicle control motors such as the steering unit, the brake unit or the hitch is being utilized, and that the pressure compensator 149 of the second circuit is set at a maximum pressure of 300 PSI. Under these conditions and assuming that there is no auxiliary equipment being operated through the second circuit to motor 124, the entire hydraulic system will be on a stand-by condition with the pump providing fluid displacement sufficient to maintain 300 PSI within the circuit. Thus, fluid will be directed to the conduit 30 against the priority valve 50, and fluid may pass through orifice 56 such that pressure will increase in the second circuit 70 (conduit 122) and will act against the upper land 150 of spool 154 in the pressure compensator 149 to urge same downwardly. Accordingly, as the pressure exceeds 300 PSI fluid will be directed through the conduit 140, through the pressure compensator 120 and into control circuit 180 to act against and urge the spool 37 of compensator 35 upwardly. Fluid then enters the conduit 42 to act against the de-stroking mechanism 19 to limit the displacement of the pump such that it will only provide 300 PSI to both circuits.

Next assume that none of the control units of the first circuit are being utilized but a rotary hydraulic motor L on an implement is being driven and requires 6 g.p.m. at 1,000 PSI. Under these conditions the operator will merely set the orifice 126 such that the motor is rotating at a proper observed speed and adjust the spring 161 of compensator 149 to increase its bias to a setting of 1,000 PSI. If the flow increases or decreases, then the pressure drop across the orifice 126 will correspondingly increase or decrease to cause shifting of the spool 136 appropriately to cause servo mechanism 19 to increase or decrease the stroke of the pistons 14. For example if the motor L tends to run too fast, the pressure in conduit 128 will exceed the pressure in conduit 130 and the pressure differential will cause the spool 136 to move downwardly whereby fluid may enter control conduit 180 and act upon compensator 35 to move its spool upwardly whereby fluid energy is directed to the servo mechanism through bore 41 to reduce the pump stroke and thereby provide smaller displacement. Alternatively if the motor L were to encounter greater resistance, such that pressure in the conduit 124a or 124b would exceed 1,000 PSI, corresponding increased pressure in conduit 122 would then act through conduit 148 against the pressure compensator 149 so as to move its spool 154 downwardly and emit fluid energy into conduit 140. Since the set flow rate has not been exceeded and spool 136 is still in its upward condition, fluid may pass between the lands 138 of spool 136 and to control conduit 180 and de-stroking mechanism 19 to diminish fluid delivery of the pump 10. Alternatively, if the flow rate to the auxiliary equipment through conduits 124a, 124b is reduced below the setting of the orifice 126, and if pressure corresponding to the pressure setting of compensator 149 is not reached, the spool 136 will be moved upwardly and thus fluid in the de-stroking chamber 22 may be discharged through the control conduit 180 about the reduced diameter of the spool 136, through the compensator 149 to the sump S, as the spring 20 increases the stroke of the pump 12. At this point it should be most apparent that with respect to auxiliary equipment, such may be operated in such a manner that the power delivered by the pump unit 10 matches but does not substantially exceed the power requirements of the associated motor attached to conduit 122.

Assume now that the operator desires to steer the vehicle and that the pump is still directing 6 g.p.m. to a load L at 1,000 PSI. Under such conditions as he turns the steering wheel 85, the hand pump in such steering unit will generate pressure in one of the pressure sensing conduits P1 or P2 so as to urge the spool 104 or 104' of the appropriate demand valve downwardly, increasing the pressure in conduit 110 which then adds to the spring force acting against the priority valve spool 54. Such will insure that the steering gets the necessary power before any is delivered to the second circuit. However the second circuit will not be deprived of the necessary power requirements since as the priority valve 50 delivers fluid to the first circuit, should the flow requirements of the flow compensator 120 not be met the spool 136 would be shifted to its upward position responsively to the decrease in pressure differential across the orifice valve 126. This permits fluid to drain from the chamber 22 of the servo mechanism through this flow compensator 120, pressure compensator 149 and to the sump so as to permit the spring 20 to increase the stroke of the pump 10 and supply additional fluid. Here the pilot relief valve 60 is effective to insure that the priority valve 50 opens as fluid pressure in the first circuit increases. Otherwise, with either of the demand valves 104 or 104' closed, the priority valve 50, as the pressures across it equalize due to the absence of flow through the orifice 57, would not reopen except for the presence of the relief valve 60. However, as the pressure in conduit 110 approaches an appropriate amount (for instance 2,200 PSI), this relief valve 60 will open reducing the pressure behind priority valve 50 as flow is established through the orifice 57, so fluid is permitted to pass to the second circuit.

Accordingly it should be appreciated that the utilization of flow and pressure control compensators in a second circuit when used in conjunction with a first circuit can be most advantageous in that the power delivered is correlated to the power which is needed by all of the loads in both of the circuits. Too, by arranging the compensator 149 at a low setting, the stand-by pressure continuously developed represents a reduced power as opposed to a system in which stand-by pressure is high (2,500 PSI).

Thus, a system is preferred in which a first circuit is associated with more critical power motors, and a second circuit is provided for providing power at a selectable rate to the auxiliary equipment. Additional priority and demand valves may be inserted in conduit 122 to provide priority power to other vehicle control motors or alternatively such motors might be placed directly in the first circuit.

We claim:

1. A pressure compensated pump having a de-stroking mechanism for controlling the displace ment thereof, an improved control system therefor comprising:
    a. a delivery conduit interconnected between said pump and adapted to be connected to a load,
    b. a first pressure control adapted to be connected to said delivery conduit for sensing the pressure in said conduit, and controlling said de-stroking mechanism so as to limit the pressure of the fluid delivered by said pump,
    c. a flow control means connected to said delivery conduit and for regulating said de-stroking mechanism so as to set a limit on the quantity of fluid delivered by said pump, and
    d. a variable pressure compensator connected to said delivery conduit for sensing the pressure in said delivery conduit, and for regulating said de-stroking mechanism so as to variably control the fluid pressure in said delivery conduit.

2. A device as recited in claim 1 in which said second pressure control means is manually variable so as to control said de-stroking mechanism such that an infinite number of pressures may be developed below the rating set by said first compensator in the delivery conduit.

3. In a variable displacement hydraulic system having a pump adapted to be connected to a power source for delivering fluid power to hydraulic motors through a delivery circuit, an improved control means comprising:
    a. a first pressure compensator,
    b. a flow control compensator,
    c. a second pressure compensator,
    d. a control circuit between said pump and a reservoir, each of said compensators having a pressure sensitive means connected in parallel to said delivery circuit and in series in said control circuit between siad pump and a reservoir, each of said compensators being effective to independently de-stroke said pressure compensated pump through said control circuit, or to increase said stroke through said control circuit.

4. A hydraulic power system comprising:
    a. a pressure compensated pump adapted for connection to a power input source, a reservoir, and a delivery conduit and having a servo mechanism responsive to fluid pressure in said delivery circuit for limiting the power developed by said pump,
    b. three three-way spool valves associated with said delivery circuit to sense the pressure or rate of flow therein,
    c. a control circuit interconnected between said servo mechanism and the reservoir, said three-way valves having a series connection with said control circuit for controlling the fluid flow in said circuit and pressure in said servo mechanism, each of said valves being responsive to pressure in said delivery circuit so as to shift in response to pressure changes to bleed fluid in said control circuit to said reservoir, or to direct fluid to said servo mechanism so as to increase the pressure therein, and thereby change the stroke of the pump.

5. An apparatus as recited in claim 4 in which:
a. an orifice is placed in said conduit and one of said spool valves is responsive to a pressure differential across said orifice.

6. An apparatus as recited in claim 4 in which:
a. one of said spool valves has means for varying its sensitivity to pressure.

7. An improved hydraulic power system comprising:
a. a variable displacement pump having a displacement control means for controlling the delivery thereof,
b. a first circuit interconnected between said pump and a first load,
c. a second circuit also connected to said pump and adapted to be connected to a second load,
d. a priority valve means separating said circuits,
e. regulator means associated with said first circuit for controlling said displacement control means of said pump so as to limit the maximum pressure developed thereby,
f. manually controlled compensator means associated with said second circuit and with said displacement control means for matching the fluid power transmitted to the second load with the power requirements thereof.

8. An apparatus as recited in claim 7 in which:
a. demand valves are associated with said priority valve means for matching the power delivered to said first circuit with the power requirements of said first circuit.

9. An apparatus as recited in claim 8 in which several loads are connected in parallel in said first circuit and a demand valve is associated with each load.

10. An apparatus as recited in claim 9 in which each of the demand valves are placed in series with said priority valve.

11. A hydraulic system comprising:
a. a pressure compensated pump having a servo mechanism for controlling the displacement thereof, a delivery circuit associated with said pump,
b. first and second circuits interconnected with said delivery circuit through a priority valve,
c. said priority valve means requiring said servo mechanism to compensate for delivery of power needs to said first circuit, with additional fluid power flowing to said second circuit,
d. compensator means in said second circuit and associated with said servo mechanism for controlling the displacement of said pump such that the displacement thereof is regulated to supply the power needs of the first circuit as well as the power needs of the second circuit, and
e. demand valves associated with loads in said first circuit and with said priority valve for matching power input to this circuit with power needs thereof.

12. An apparatus as recited in claim 11 in which said demand valves have a series connection with said priority valve.

13. An apparatus as recited in claim 11 in which:
a. said compensator means are flow responsive.

14. An apparatus as recited in claim 11 in which:
a. a variable orifice is placed in said second circuit and,
b. said compensator means in said second circuit responds to pressure before and after said orifice so as to control the rate of fluid delivery from said pump.

15. A hydraulic system comprising:
a. pump means having a de-stroking means to control the displacement thereof and a delivery conduit for receiving its discharge,
b. first and second circuits separated by a priority valve for insuring the necessary power is directed to said first circuit,
c. regulator means including a flow sensing device in said second circuit for de-stroking said pump as fluid delivered thereto reaches a selectable limit.

16. An apparatus as recited in claim 15 in which said regulator means comprises a pressure sensing device.

17. A hydraulic power system comprising:
a. variable displacement pump means having a servo mechanism for controlling displacement,
b. a first circuit connected to said pump for directing power to a motor,
c. a second circuit connected to said pump for directing power to a second motor,
d. demand priority means associated with said pump for separating said circuits and for insuring power is directed to said first circuit to actuate motors associated therewith,
e. power regulator means associated with said second circuit for controlling the displacement of said pump so as to provide power to actuate the motor associated with said second circuit in proportion to its power requirements.

18. A hydraulic power system comprising:
a variable displacement pump means having a servo mechanism for controlling displacement;
a delivery conduit means for receiving the discharge of said pump means and capable of being connected with a hydraulic motor;
a pressure compensator means connected with said conduit means for sensing the pressure therein and causing the servo mechanism to de-stroke the pump means when a predetermined maximum pressure is reached; and
a flow compensator connected with said conduit means for sensing the flow therethrough and causing the servo mechanism to de-stroke the pump means when a predetermined maximum flow is reached;
whereby the displacement of the pump means is decreased whenever either said predetermined pressure or said predetermined flow is reached in said conduit.

19. A hydraulic power system according to claim 18, and further comprising:
manually adjustable orifice means in said conduit means for selectively adjusting said predetermined maximum flow therethrough.

20. A hydraulic power system according to claim 19, and further comprising:
manually adjustable spring means for selectively adjusting said predetermined maximum pressure.

* * * * *